UNITED STATES PATENT OFFICE 2,460,698

CANDY CHEWING GUM

Eric G. Lindhe, Hastings on Hudson, N. Y., assignor to Sweets Laboratories, Inc., New York, N. Y., a corporation of New York No Drawing. Application March 7, 1946, Serial No. 652,798

10 Claims. (Cl. 99—135)

The present invention relates to a novel candy chewing gum and to methods applied in making same.

It has been found that chewing gum, and particularly the gum base therein, is susceptible to oxidative deterioration and tends to lose many desirable properties upon standing and particularly upon exposure to warm or humid atmospheres. This is true even though the chewing gum contains large quantities of sugar and glucose or dextrose and may be coated with sugar or have a closely adherent glazed sugar or wax coating.

It is among the objects of the present invention to prepare a new chewing gum confection, quite different from ordinary chewing gum or hard candy in consistency, which may be termed a candy chewing gum, and which will be remarkably stabilized against oxidative and atmospheric deterioration.

A further object of the present invention is to prepare a candy chewing gum which can be made in any shape and color now used in the manufacture of hard candy, which is not possible with ordinary chewing gum.

A still further object of the present invention is to prepare a candy chewing gum which, due to the density of the confection itself in its combination with the gum base, will maintain its flavor goodness over a longer period than can be obtained in ordinary chewing gum.

A still further object of the present invention is to make possible a far less expensive method of production, so far as both machinery and labor are concerned, than is involved in the manufacture of ordinary chewing gum.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In making ordinary chewing gum, it is the practice to melt the base and then to mix in the sugar. This method introduces a certain amount of oxygen directly into the gum base, thereby promoting oxidative and atmospheric deterioration. It has now been found in making candy chewing gum that by mixing gum base with boiled sugar or candy in its hot liquid state, oxygen is eliminated and a perfect insulation established. This protects against the rapid deterioration so marked in ordinary chewing gum, with consequent loss of flavor, and will also preserve the chewing qualities of the gum base itself.

To make candy chewing gum, the sugar, glucose or dextrose is combined with the gum base in the cooking process at a temperature of from 230° F. to 260° F.

Desirably, the sugar and glucose syrups, in proportions of 2 to 5 parts of sugar to each part of glucose, are cooked until semi-solid or plastic, when all moisture is removed. The cooking may be carried out at a temperature ranging up to 300° F. In vacuum pans this cooking temperature is proportionately lowered corresponding to the inches of vacuum carried in the cooker. Flavoring material is added after the cooking and the mixture of cooked sugar and gum base at a temperature of about 150° F.

The gum base may contain combinations of natural and synthetic chicles and resins. The gum base may be made, for example, according to the following prior art patents: Nos. 1,534,929; 1,534,930; 1,534,931; 1,930,436; 1,975,447; 2,050,272; 2,190,180.

To give specific examples as to the proportions employed:

Example I

| | Per cent by weight |
|---|---|
| Gum base | 20 to 25 |
| Cane sugar | 70 to 60 |
| Glucose | 10 to 15 |

Example II

| | Parts by weight |
|---|---|
| Gum base | 3 |
| Cane sugar | 6 |
| Glucose | 1 |

(plus about 1% flavoring material)

Example III

| | Parts by weight |
|---|---|
| Gum base | 2 |
| Cane sugar | 7 |
| Glucose | 1 |

(1% flavoring material)

Example IV

| | Per cent by weight |
|---|---|
| Gum base | 20 |
| Invert sugar | 60 |
| Glucose | 20 |

After the compound is made, the material is extruded or pulled and appears to be a candy of superior density which will retain its taste and flavor over considerable periods of time without deterioration.

The candy chewing gum produced according to this invention has the external appearance of a smooth glistening boiled candy or sweet and it is homogeneous throughout and in this appearance and homogeneity it differs substantially from chewing gum, either of the sugar coated or uncoated variety. It appears to be a homogeneous emulsion of gum base in sugar with much finer subdivision, approaching colloidal size, as contrasted to normal chewing gum. The cooked candy or sugar encompasses and encloses the finely dispersed gum base particles and it is not possible to distinguish them in cross section. The final product may be brittle or non-brittle, but it is relatively breakable as compared to bendable and flexible chewing gum. It is devoid of flakes or grains of sugar. It tastes and has mouth effect of candy when initially placed therein.

The starting sugar material may be a cane sugar syrup (say 50% to 60% sugar), a glucose syrup (say 57% sugar), an invert sugar syrup (say 50% to 60% sugar) and before combination with the gum base the moisture is reduced to less than 10%, or, preferably, less than 5%, or even less than 1%, by cooking or boiling in the atmosphere up to 258° F. to 260° F. or in a vacuum pan up to 150° F. to 160° F. The gum base may be elevated in temperature up to 200° F. to 210° F. or above and may be added with vigorous agitation to the still molten hot sugar syrup. Preferably, the gum base may be allowed to melt into the syrup. Contrarily, if desired, the molten hot sugar may be added to the heated gum base.

The gum base should not be held at a temperature which will interfere with its chewing properties. For example, it should not be held at a temperature in excess of 225° F. to 250° F. before or during mixture with the boiled sugar.

Then the flavoring is added after the temperature of the mixture has dropped to about 150° F. The flavoring may be oil of peppermint, cloves, wintergreen, cinnamon, wild cherry, lime, or other suitable flavors. The mixing may be carried out in a baker's mixer, copper stirring kettles, in a revolving drum or in other suitable equipment. Essentially, a hot liquidized gum base is combined with a hot liquidized dehydrated sugar material in such equipment.

If desired, cream of tartar may be added in small quantities to give the material a better pull and tenacity during manufacture and a brittle consistency in the finished product.

For example, 25 to 50 grams of cream of tartar may be used per pound of sugar. Apparently the cream of tartar makes the product tougher and more pullable in its heated state and more brittle after cooking.

It is also desirable in many instances to include small amounts of corn starch, say up to 1 to 5%.

In extrusion of the final candy chewing gum, it has been found best to maintain the mixture at a temperature of 130° F. to 150° F. The final material may be extruded in various cross sectional shapes, such as circular, oval, half round, annular, square, hexagon and so forth, and then cut into lengths.

As many changes could be made in the above candy chewing gum compositions and method of making the same, and many widely varying embodiments of this invention could be made without departing from the scope of the claims, it is intended that all matter contained in the above description shall be interpreted as illustrative and not in a limiting sense.

What is claimed is:

1. A hard-candy-like chewing gum stabilized against oxidative deterioration having a uniform homogeneous hard - candy - like appearance throughout its interior inside of its surface and having a tendency to crunch and fracture like hard candy and consisting of a uniform homogeneous dispersion of substantially dehydrated sugar as an exterior phase and chewing gum base dispersed therethrough as an interior phase, said chewing gum base being invisible to the eye along the fractures, said gum gradually being converted from hard candy texture to chewing gum texture and forming an elastic cud when retained in the mouth and chewed.

2. A process of making a hard-candy-like chewing gum stabilized against oxidative deterioration having a uniform homogeneous hard-candy-like appearance throughout its interior inside of its surface and having a tendency to crunch and fracture like hard candy and consisting of a uniform homogeneous dispersion of substantially dehydrated sugar as an exterior phase and chewing gum base dispersed therethrough as an interior phase, said chewing gum base being invisible to the eye along the fractures, said gum gradually being converted from hard candy texture to chewing gum texture and forming an elastic cud when retained in the mouth and chewed, which comprises dispersing gum base in a hot liquid dehydrated sugar.

3. A method of making a hard-candy-like chewing gum having a uniform homogeneous hard-candy-like appearance throughout its interior comprising dispersing gum base into boiled sugar in its hot liquid state, said sugar having been cooked before introduction of the gum base until substantially all moisture is removed.

4. A method of making a hard-candy-like chewing gum having a uniform homogeneous hard-candy-like appearance throughout its interior comprising dispersing gum base into boiled sugar in its hot liquid state, said sugar having been cooked before introduction of the gum base until substantially all moisture is removed at a temperature up to 300° F.

5. A method of making a hard-candy-like chewing gum having a uniform homogeneous hard-candy-like appearance throughout its interior comprising dispersing gum base into boiled sugar in its hot liquid state, said sugar having been cooked before introduction of the gum base until substantially all moisture is removed and then adding flavoring material at a temperature of about 150° F.

6. A method of making a hard-candy-like chewing gum having a uniform homogeneous hard-candy-like appearance throughout its interior comprising dispersing gum base into boiled sugar in its hot liquid state, said sugar having been cooked before introduction of the gum base until substantially all moisture is removed at a temperature of 258° F. to 300° F. at atmospheric pressure until the moisture content is reduced to less than 5%.

7. A method of making a hard-candy-like chewing gum having a uniform homogeneous hard-candy-like appearance throughout its interior comprising dispersing gum base into boiled sugar in its hot liquid state, said sugar having been cooked before introduction of the gum base until substantially all moisture is removed at a temperature of up to 150° F. to 160° F. in a vacuum pan.

8. A method of making a hard-candy-like chewing gum having a uniform homogeneous hard-candy-like appearance throughout its interior comprising dispersing gum base into boiled sugar in its hot liquid state, said sugar having been cooked before introduction of the gum base until substantially all moisture is removed and until its moisture content is not over 1%.

9. The chewing gum of claim 1 in which the dehydrated sugar has less than 5% of moisture.

10. The chewing gum of claim 1 in which the dehydrated sugar has less than 1% of moisture.

ERIC G. LINDHE.

REFERENCES CITED

The following references are of record in the file of this patent:

UNITED STATES PATENTS

| Number | Name | Date |
|---|---|---|
| 280,115 | Aubin | June 26, 1883 |
| 2,224,637 | Mahle | Dec. 10, 1940 |